United States Patent

Melnichuk et al.

[11] Patent Number: 5,902,915
[45] Date of Patent: May 11, 1999

[54] PROCESS FOR PRODUCING LIQUID HYDROCARBONS

[75] Inventors: Larry Jack Melnichuk; Karen Venita Kelly, both of Rockwood, Canada

[73] Assignee: Lawrence Plasma Research Laboratory Inc., Concord, Canada

[21] Appl. No.: 08/822,613

[22] Filed: Mar. 20, 1997

[51] Int. Cl.[6] ............................. C10G 1/00; C07C 1/00; C10B 53/00
[52] U.S. Cl. ................... 585/241; 585/240; 585/733; 201/2.5; 201/25; 588/210; 588/227; 588/228; 208/402
[58] Field of Search .................. 585/240, 241, 585/733; 208/400, 402, 408; 588/227, 228, 210; 423/449.7; 201/2.5, 25

[56] References Cited

U.S. PATENT DOCUMENTS

| | | |
|---|---|---|
| 3,780,675 | 12/1973 | Frye et al. . |
| 4,173,190 | 11/1979 | Greenberg et al. . |
| 4,244,505 | 1/1981 | Stokes, Jr. et al. . |
| 4,313,011 | 1/1982 | Weil et al. . |
| 4,344,826 | 8/1982 | Smith . |
| 4,366,063 | 12/1982 | O'Connor . |
| 4,438,706 | 3/1984 | Boday et al. . |
| 4,479,443 | 10/1984 | Faldt et al. . |
| 4,508,040 | 4/1985 | Santen et al. . |
| 4,541,907 | 9/1985 | Culleiton et al. . |
| 4,582,004 | 4/1986 | Fey et al. . |
| 4,618,735 | 10/1986 | Bridle et al. . |
| 4,644,877 | 2/1987 | Barton et al. ............................. 110/250 |
| 4,715,965 | 12/1987 | Sigerson et al. . |
| 4,770,109 | 9/1988 | Schlienger . |
| 4,831,944 | 5/1989 | Durand et al. . |
| 4,850,498 | 7/1989 | Taylor . |
| 4,886,001 | 12/1989 | Chang et al. . |
| 4,934,286 | 6/1990 | Fowler . |
| 4,960,380 | 10/1990 | Cheetham . |
| 4,980,092 | 12/1990 | Pineau et al. . |
| 4,989,522 | 2/1991 | Cline et al. . |
| 5,010,829 | 4/1991 | Kulkarni . |
| 5,022,848 | 6/1991 | Fowler ........................................ 431/2 |
| 5,090,340 | 2/1992 | Burgess . |
| 5,108,718 | 4/1992 | Dummersdorf et al. . |
| 5,131,993 | 7/1992 | Suib et al. ............................... 204/168 |
| 5,134,944 | 8/1992 | Keller et al. . |
| 5,135,723 | 8/1992 | Fuller . |
| 5,138,959 | 8/1992 | Kulkarni . |
| 5,336,825 | 8/1994 | Choudhary et al. ..................... 585/500 |
| 5,369,947 | 12/1994 | Dummelsdorf et al. ............... 60/39.02 |

FOREIGN PATENT DOCUMENTS

| | | |
|---|---|---|
| 2026103 | 9/1990 | Canada . |
| 0392727 | 4/1990 | European Pat. Off. . |
| 3725584 | 2/1989 | Germany . |
| 9105030 | 4/1991 | WIPO . |

*Primary Examiner*—Bekir L. Yildirim
*Attorney, Agent, or Firm*—Nancy E. Hill; Hill & Schumacher; Dowell & Dowell, P.C.

[57] ABSTRACT

A process for producing liquid hydrocarbons from hydrocarbon materials is disclosed. The hydrocarbon materials are heated to a temperature above 400° C. thereby producing a gas stream. A gaseous plasma is generated. The gas stream is passed through the gaseous plasma thereby producing a heated gas stream. The heated gas stream is saturated with a hydroxide ion to produce a saturated gas stream. The saturated gas stream is cooled to standard temperature and pressure and is condensed to produce liquid hydrocarbons and waste gases.

15 Claims, 7 Drawing Sheets

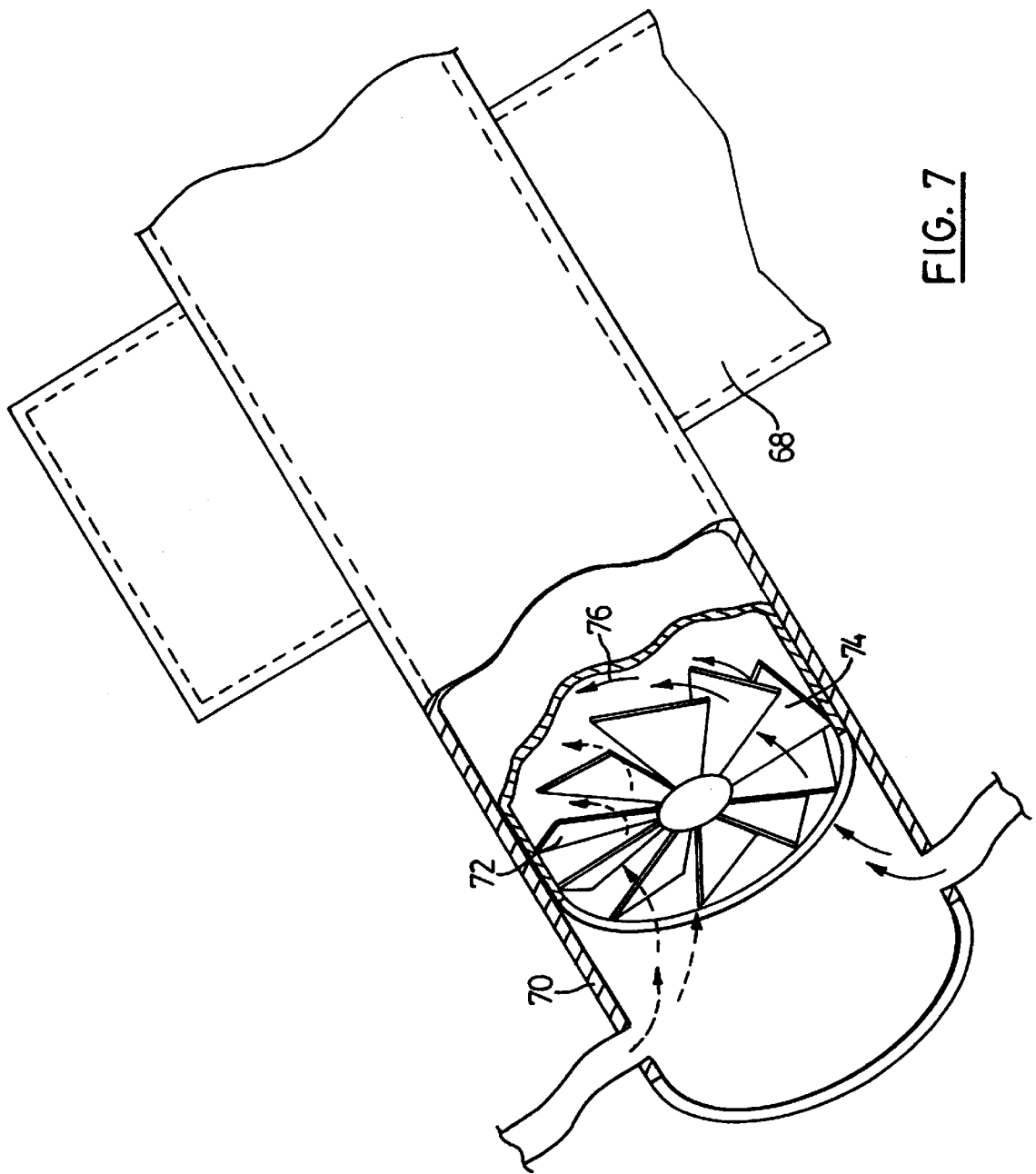

PROCESS FOR PRODUCING LIQUID HYDROCARBONS

BACKGROUND OF THE INVENTION

1. Field of the Invention

This invention relates a process for converting carbon materials to liquid hydrocarbons. The process is particularly useful for converting used tires into liquid hydrocarbons.

2. History of the Related Art

The destruction of waste has been an every increasing problem in developed and developing countries. The traditional methods of dealing with organic waste has been to dump it in landfill sites or to incinerate it. Clearly each method of dealing with waste has very serious consequences.

Specifically, incineration produces high volumes of air emissions which are not only toxic but, in some cases, carcinogenic. Typically the air emissions contain both carbon monoxide and carbon dioxide along with nitrous oxides, dioxins and furans. Therefore, incineration causes a number of dilatory effects through the production of carbon monoxide, which is a toxic substance; carbon dioxide, which is considered a greenhouse gas; and nitrous oxides, which are significant contributors to acid rain.

Incineration requires substantial amounts of air under ideal conditions to produce complete combustion. Where complete combustion occurs the gases which are produced are carbon monoxide, carbon dioxide and nitrous oxide; these gases which are toxic, contribute to greenhouse effect and contribute to acid rain. However, typically complete combustion does not occur and when incomplete combustion occurs in addition to carbon monoxide, carbon dioxide and nitrous oxide, gaseous hydrocarbons are also produced. Many of these gaseous hydrocarbons are considered to be carcinogenic. Therefore when combustion is used as a method of waste destruction, typically incomplete combustion occurs and toxic and carcinogenic gases are typically released into the atmosphere causing a significant impact on the environment.

More recently the trend in waste disposal is developing methods wherein there is as close to zero impart on the environment as possible. The current trend is to reuse and recycle materials as much as practicable. In addition, the world community is currently taking a more a aggressive stance on the disposal of waste and in particular air emissions.

Some processes have been suggested to alleviate the problems associated with incineration. For example gas emissions are often passed through a "scrubber" wherein the gas stream is passed through or sprayed with an aqueous solution of sodium hydroxide. The objective of "scrubbing" the gas stream is to remove hydrochloric gases, which are known to be carcinogenic, from the gas stream. In "scrubbing" the gas stream the hydrochloric gases are removed from the gas stream and after "scrubbing" the substances which are left, including such gases as carbon monoxide, carbon dioxide, nitrogen, hydrogen, and methane. In addition, water discharges containing chloride salt, are released into the atmosphere. These sorts of solutions were suggested in U.S. Pat. Nos. 5,138,959 and 5,010,829 both issued to Kulkami and U.S. Pat. No. 4,934,286 issued to Fowler. These inventions are directed to methods of improving the quality of the gas emissions. There is nothing in these inventions directed to changing the nature of the final products. That is there is nothing in these inventions directed to producing liquids rather than gases.

The inventors have co-pending applications, the first of which is directed to a process for the conversion of solid waste to liquid hydrocarbons and the second of which is directed to a process for the conversion of gaseous hydrocarbons to liquid hydrocarbons. The first application discloses a process wherein energy is applied to material to dissociate the material into a gaseous byproduct and to break the bonds in long carbon chains. The gaseous byproduct is then partially cooled but the gaseous byproduct is maintained in its unstable form so that the gases which form the gaseous byproducts do not recombine so as to form stable gases. The partially cooled unstable gaseous byproducts are then reacted and condensed in a catalytic condenser containing preferably sodium hydroxide to form a reacted solution comprising liquid hydrocarbons. The liquid hydrocarbons are then separated from the reacted solution.

The second application is directed to a process for converting gaseous hydrocarbons, having in combination at least one carbon atom and hydrogen group, into liquid hydrocarbons. The process includes the steps of dissociating the gaseous hydrocarbons in the absence of oxygen and breaking at least some of the bonds in the hydrocarbon to produce unstable gaseous byproducts. Then the unstable gaseous byproducts are reacted with a solution chosen from the group consisting of hydroxide bases and carbonate bases to produce a reacted solution comprising at least some liquid hydrocarbons. Typically sodium hydroxide is used. This process is ideally suited for the conversion of Butane to butanol wherein in the above process hydrogen ion is reacted with the unstable gaseous byproducts to form the neutral butanyl radical.

The present invention is an improvement over the co-pending applications so that commercially viable results are achievable. The process is improved by including in the process, among other steps, the step of passing the unstable gaseous byproducts through a gaseous plasma.

SUMMARY OF THE INVENTION

The present invention is a process for producing liquid hydrocarbons from hydrocarbon materials. The hydrocarbon materials are heated to a temperature above 400° C. thereby producing a gas stream. A gaseous plasma is generated. The gas stream is passed through the gaseous plasma thereby producing a heated gas stream. The heated gas stream is saturated with a hydroxide ion to produce a saturated gas stream. The saturated gas stream is cooled to standard temperature and pressure and is condensed to produce liquid hydrocarbons and waste gases.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 7 is a enlarged sectional view with a portion broken away of the swirl jet of the plasma generator.

DETAILED DESCRIPTION OF THE INVENTION PROCESS

Figure 1:
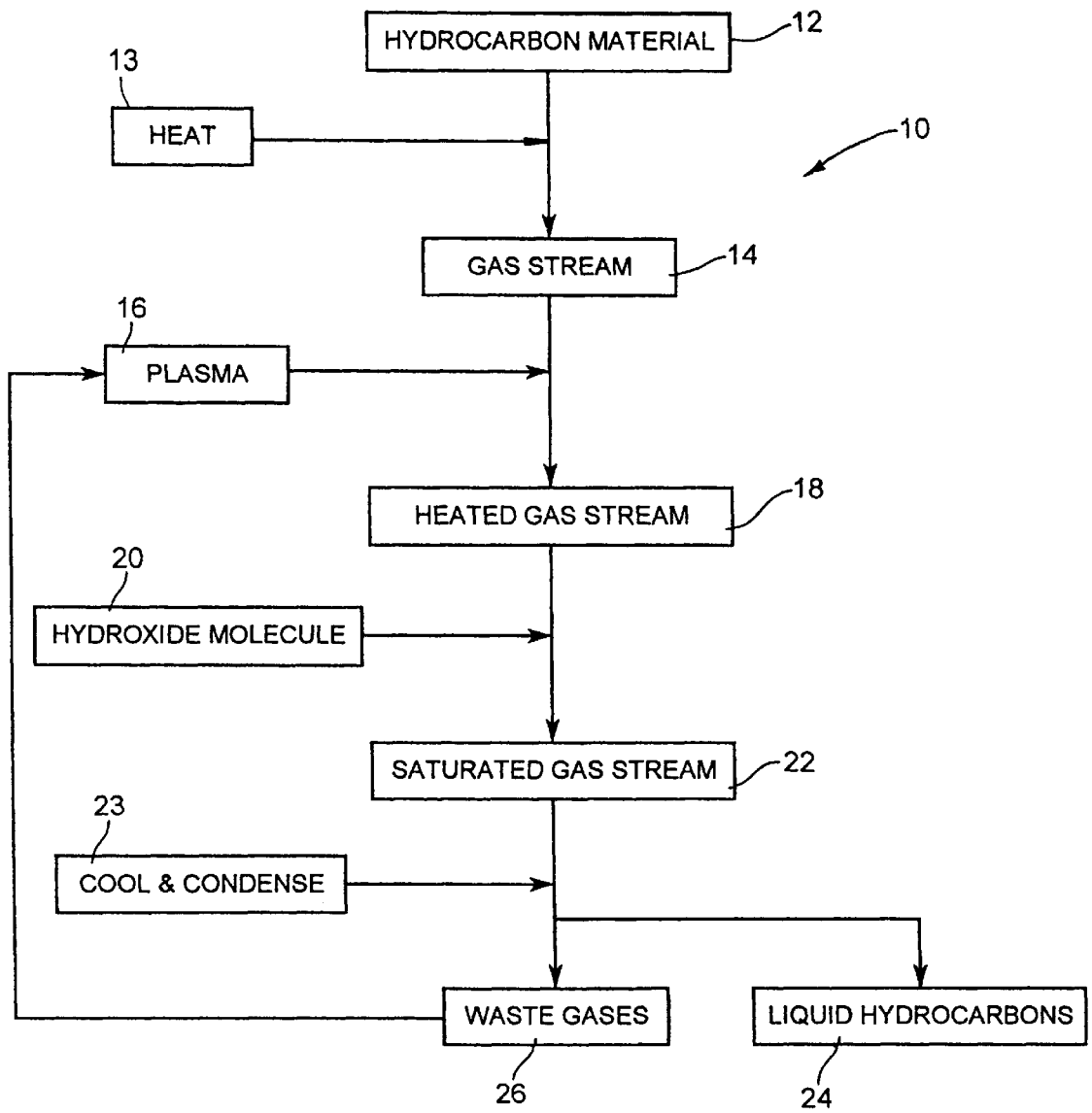
FIG. 1 is a block diagram of the process of the present invention.

The primary elements of the process for producing liquid hydrocarbons of the present invention is shown generally at 10 in the block diagram of FIG. 1. The hydrocarbon material 12 is heated at 13 to a temperature above 400° C. thereby producing a gas stream 14. A gaseous plasma 16 is produced and the gas stream is passed through the gaseous plasma 16 thereby producing a heated gas stream 18. The heated gas stream 18 is saturated with hydroxide molecule 20 to produce a saturated gas stream 22. The saturated gas stream 22 is cooled at 23 to condense the liquid hydrocarbons 24 and waste gases 26.

Tires are readily available and thus are a good source of hydrocarbon material 12 for the process of the present invention. Heretofore tires have caused an environmental problem with regard to their disposal. In order to help deal with this problem, consumers often must pay a fee to dispose of the tires. Accordingly where tires are available they are a very economical source of hydrocarbon material. In addition where tires are used, the process herein provides a much needed method of disposing of tires, the disposal of which has become a very severe environmental problem. Since tires are relatively homogeneous they are easier to handle than other more heterogeneous material. However, the basic process will work with other materials composed of hydrocarbon materials. Generally the process will be described using tires as the hydrocarbon material for ease of understanding.

Tires 12 are cut into pieces of approximately 6 inches in diameter. The inventors have found that if whole tires are used the heat transfer during the heating phase is not very efficient. Alternatively, if the tires are shredded too small the material may become airborne in the gas stream. Accordingly, the tires are shredded to improve the heat transfer but not so small that the lighter particles will become airborne.

The material is heated to above 400° C. to create a gas stream. Often to heat the material to 400° C. the furnace has to be heated to 600–800° C. The Inventors have theorized that in this stage of the process some of the electro-static bonds which essentially hold the molecule together are broken. The tires have numerous bonds of various energy levels. Preferably during the heating phase the low energy bonds are broken, and thereby create species of gases which would interact with the hydroxide ions. When the material is heated to 400° C. long chain hydrocarbons generally fragment into smaller chains, the majority of which, in seeking their lowest energy state, tend to form stable rings often referred to as aromatics. These stable rings or aromatics are unaffected by a plasma of ionized helium and ionized hydrogen. As well, these stable rings do not react with the hydroxide ions. These stable rings or aromatics are generally liquids at standard temperature and pressure (STP).

In contrast, the smaller chain carbon molecules remaining are a variety of single to quintuple carbons with and without oxygen and hydrogen atoms attached thereto. Single carbons which remain will form char and either are carried along in the gas stream or remain in the furnace. Single carbons which interact with oxygen molecules, if they are present, form carbon monoxide (CO). Carbon-hydrogen molecules from $C_1$ to $C_5$ are stable gases at STP and are very difficult to de-stabilize under normal conditions. Accordingly, the gas stream is passed through the plasma 16 and by doing so $C_xH^+$ radicals are formed. If these remain in a radical state when the heated gas stream is saturated with the hydroxide ion, alcohols will form.

Preferably a microwave induced plasma 16 is created. Plasma 16 is preferably ignited with the use of helium. Once the plasma is ignited the compressed gases 48 are mixed with the helium. Once the plasma has been running and gases are evolved in the system no further pure helium need be added. The evolved gases are cycled back through the plasma generator and the plasma becomes self sustaining. Helium is a carrier gas and is not consumed or changed in the process. Once the evolved gases form part of the plasma, helium is approximately 20 per cent of the gas which forms the plasma.

Gas stream 14 is passed through the plasma to ionize the gas stream and produce a heated gas stream. The inventors theorize that during this phase of the process 'abstraction' is taking place. The art of abstraction relies on the introduction of a greater electro-negative atomic source. That is, during this phase, a hydrogen atom is being removed from the molecules in the gas stream such as the methane molecules. Thus the methane molecules become a radicals.

In order to maintain a high percentage of $C_xH^+$ radicals, the heated gas stream is kept above 400° C. It is then saturated with the hydroxide ion to produce unsaturated hydrocarbons. Above a certain temperature, approximately 450° C., the CH bonds start to disintegrate and predominately form CO and $H_2$. Therefore, the heated gas stream is preferably kept between 400–450° C. When the heated gas stream is saturated with the hydroxide ion, the hydroxide ion becomes attached to the radicals which are present in the heated gas stream. For example, from an initial material of mostly $CH_4$ a radical $CH_3^+$ is formed on heating, after the radical is saturated with the hydroxide an unsaturated hydrocarbon is formed mostly $C_6H_6$ (benzene) and hydrogen. The benzene is a liquid at STP. However, at STP, hydrogen is a gas. It will be appreciated by those skilled in the art that hydrogen is a good fuel source which upon combustion also becomes a liquid ($H_2O$) at STP. Accordingly the hydrogen may be removed by way of molecular filters.

Preferably the process is conducted at a negative pressure so that the gas stream is draw threw the process. In particular during the heating phase it is important that the pressure is not allowed to build up because higher pressures will cause the radicals to recombine.

Figure 2:
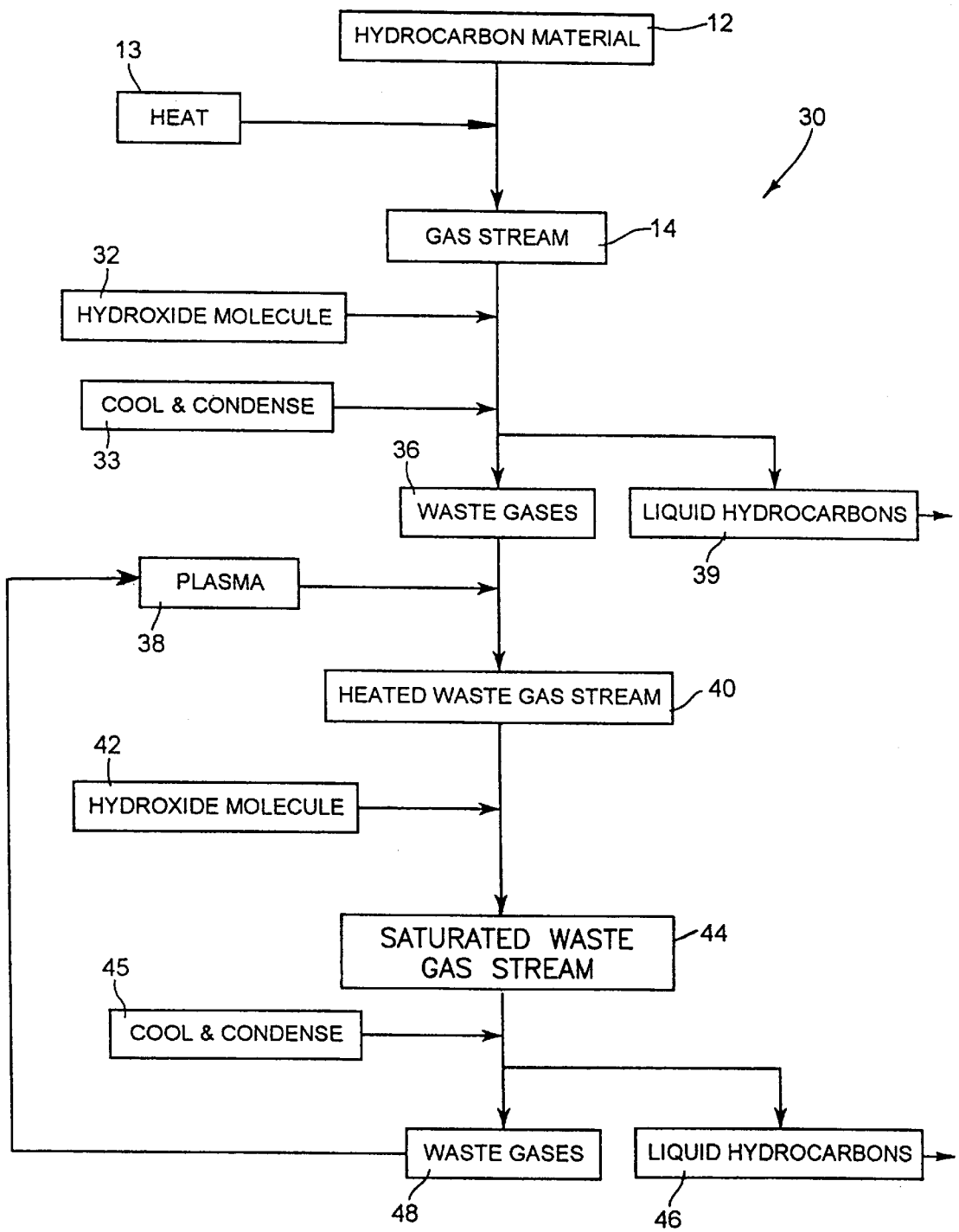
FIG. 2 is a block diagram of an alternate embodiment of the process of the present invention.

FIG. 2 shows a block diagram of an alternate embodiment of the process of the present invention. In this embodiment the plasma is introduced at a later stage. In this embodiment the hydrocarbon material 12 is heated at 13 to a temperature above 400° C. to produce a gas stream 14, the gas stream is maintained above 400° C. and preferably between 400–450° C. and is saturated with hydroxide ion 32. The saturated gas stream is then cooled and condensed 33 to produce liquid hydrocarbons 34 and waste gases 36. The waste gases are passed through a plasma 38 to produce a heated waste gas stream 40. The heated waste gas stream is maintained above 400° C. and is saturated with hydroxide ion 42. The saturated waste gas stream 44 is then cooled and condensed at 45 to form liquid hydrocarbons 46 and waste gases 48.

APPARATUS

Figure 3:
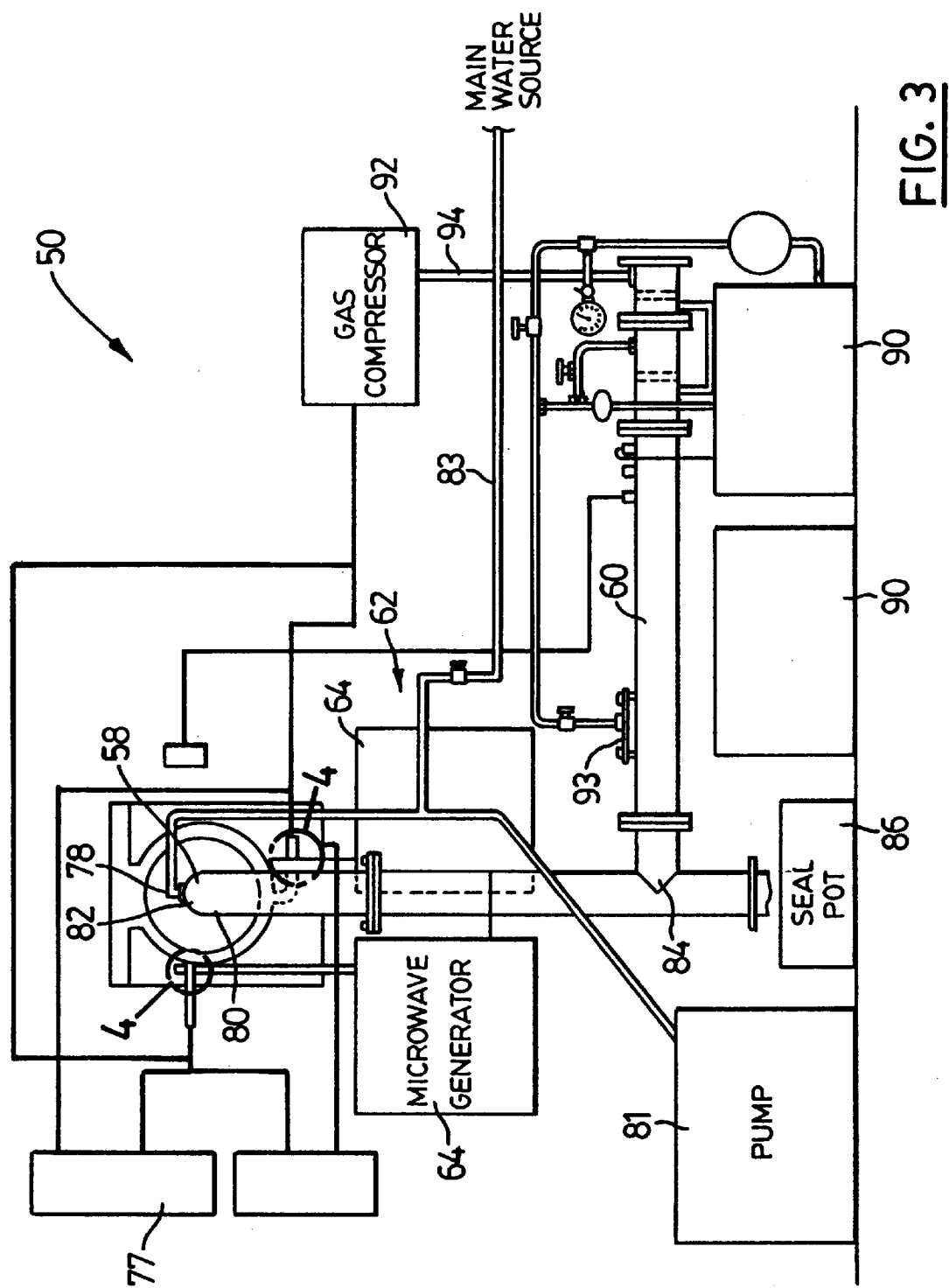
FIG. 3 is a front view of the apparatus used in the process of the present invention.
Figure 4:
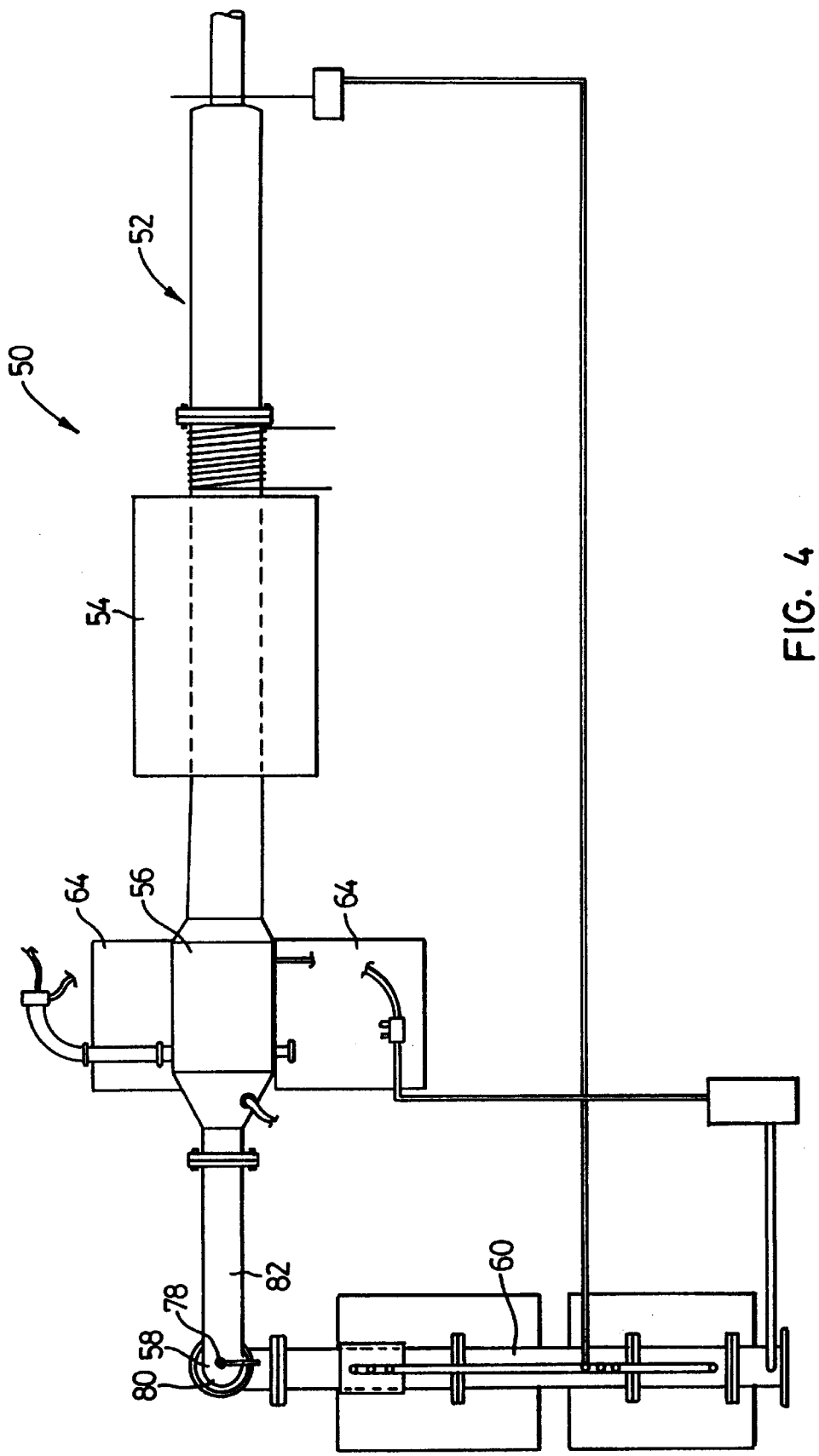
FIG. 4 is a top view of the apparatus used in the process of the present invention.
Figure 5:
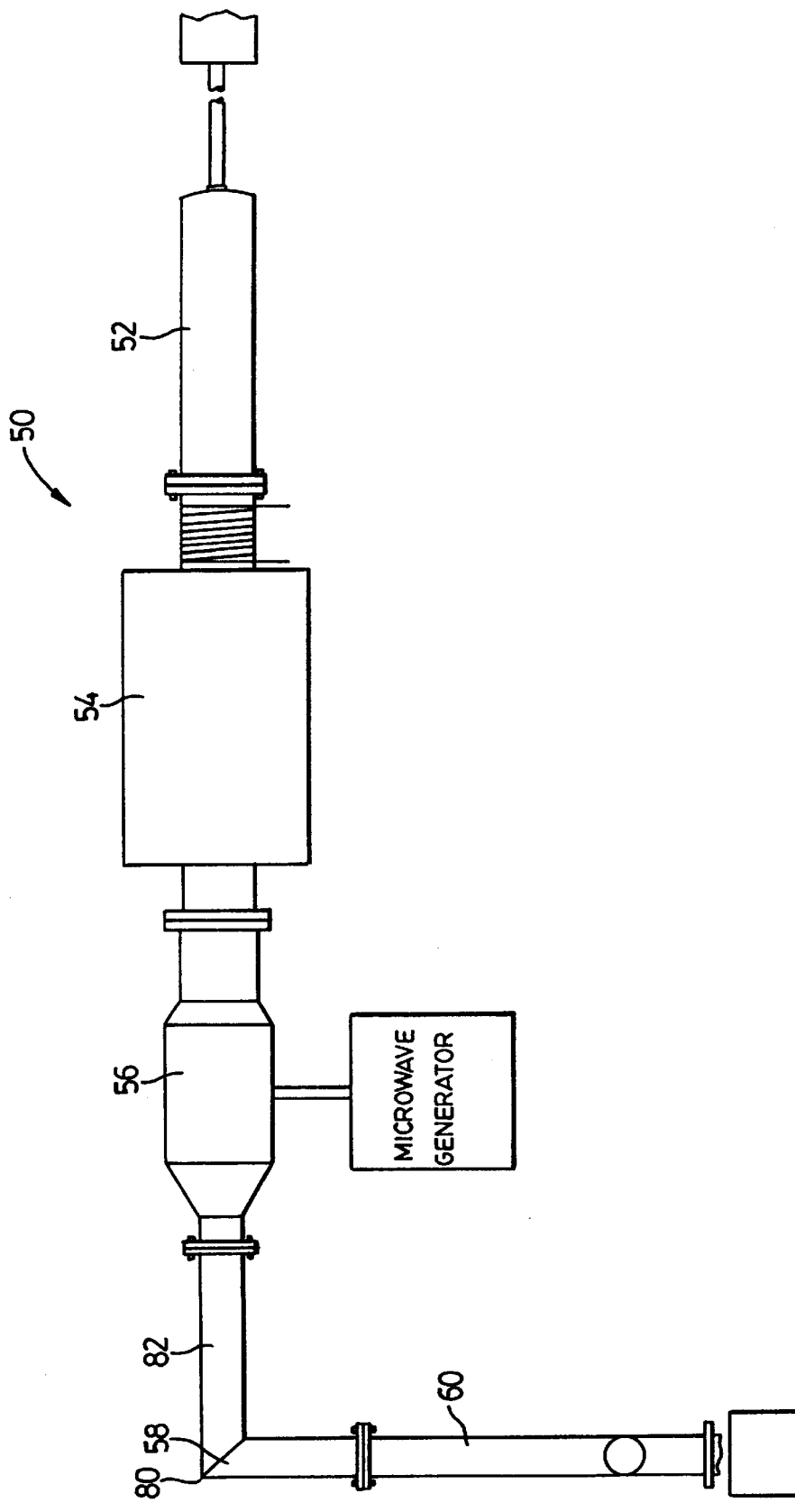
FIG. 5 is a side view of the apparatus used in the process of the present invention.

Referring to FIGS. 3, 4 and 5, the apparatus generally shown at 50 includes a feed system 52, a furnace 54, a plasma zone 56, a spray zone 58 and a condensing zone 60.

Feed system 52 feeds the material into furnace 54 in the absence of air. The feed system pushes the material through the furnace. The rate that the material passes through the furnace is determined by the feed system 52. Thus the dwell time of the material in furnace 54 is determined by the feed system 52. The feed system is constructed so as to limit the air which enters the system.

Furnace 54 has three separately controllable heating zones. Typically each heating zone will be hotter than the previous zone. In furnace 52 the material is volatilized and accordingly the preferred temperature of the furnace will be dependent on the material input. Preferably, for tires, the temperature of the material will be raised to 600° C., Where the material is more heterogenous, such as biomedical waste, the temperature of the furnace should be raised 1200° C. with the first zone at 800° C., the second 1000° C. and the third 1200° C. Typically, when handling biomedical or other mixed waste, the temperature of the furnace should not be in excess of 1200° C. since above this temperature the glass and metal particulate will melt together, thus making these materials more difficult to recycle. The furnace could be a resistance heating system or a hydrogen burner system. This could also be described as wherein the input material is predominantly short carbon chains (C5 or less) the temperature range is between 450° C. and 650° C. and wherein the input is predominantly long carbon chains (C6 or greater) the temperature range is between 650° C. and 1000° C.

Wherein a resistance heating system was used for furnace 54 the temperature of the furnace was brought to 800° C. in order to bring the shredded tires to a temperature of 500° C. Wherein the apparatus is used to convert shredded tires into liquid hydrocarbons the initial heating zone of the furnace could be considered a conditioning step wherein the material is raised to a temperature of 200° C. and the processing oils are volatilized. Once the processing oils are volatilized the tires, predominantly styrene and butadiene will then be volatilized.

Note when the input material has a water content that is greater than 80% an initial drying step must be introduced before entering the furnace. Input material having a water content of less that 80% can be input directly into furnace 52.

Optionally, where it is desirable to reduce the amount of char residue, oxygen may be introduced into furnace 52. Preferably in addition to oxygen being added to the system hydrogen as well will be added in the furnace 52. Char in the presence of oxygen will volatilize at approximately 500° C. However char, in the absence of oxygen, will volatilize at temperatures above 1600° C. The oxygen may be introduced into the system by way of introducing superheated steam into furnace 52. Wherein superheated steam is used to introduce oxygen into furnace 52 hydrogen will also be introduced. The superheated steam generator (not shown) raises the steam to 400° C. Where superheated steam is introduced into furnace 52, both oxygen and hydrogen are added to the system. The handling of char is particularly relevant when tires are being processed by the system.

Plasma zone or reactor 56 is that portion of the apparatus wherein the gas stream is passed through or mixed with a plasma. At this stage of the process it is important that the gas stream be at or above 400° C. The reactor 56 may be wrapped in a thermal blanket to reduce the heat loss in the system.

Figure 6:
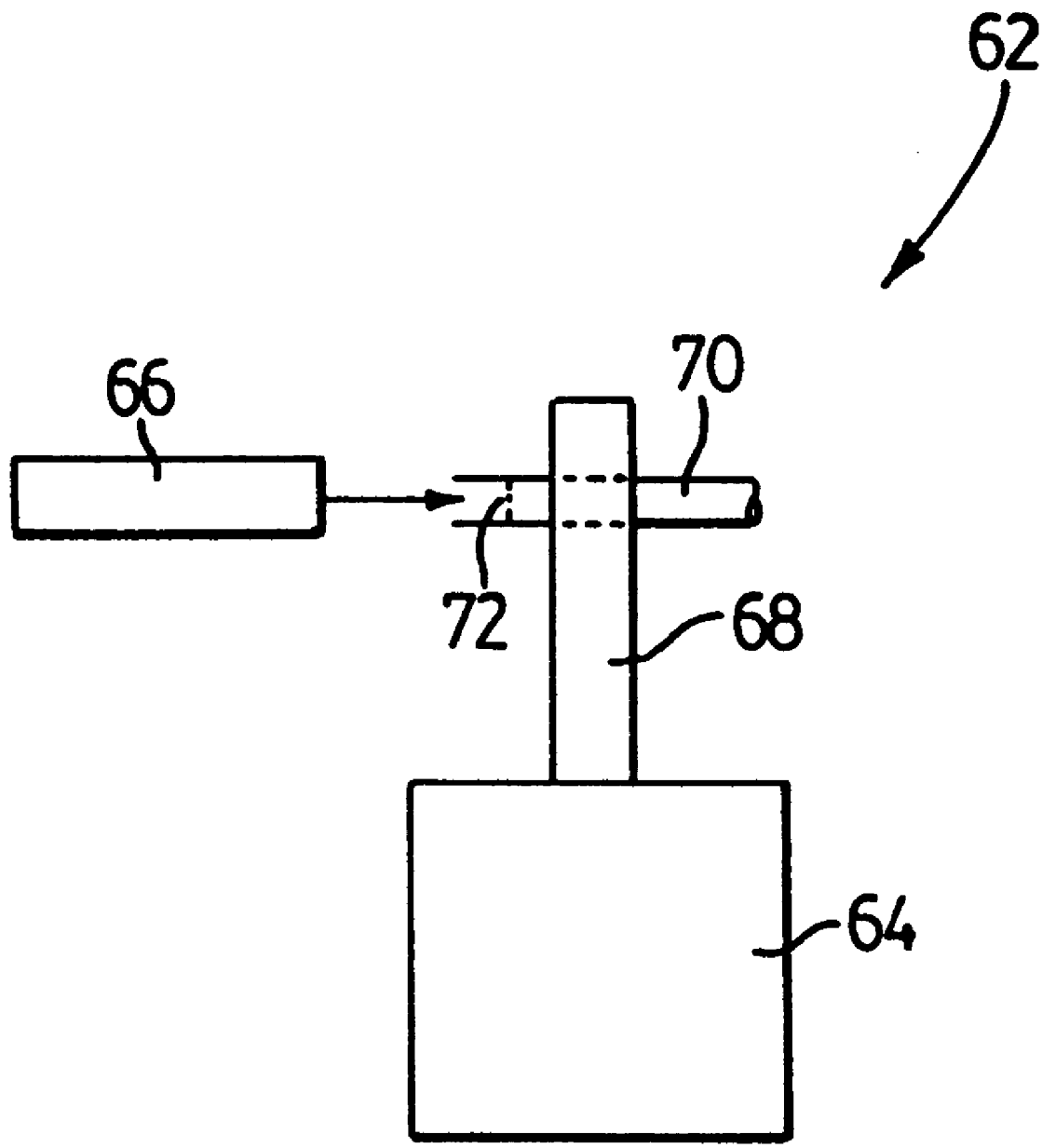
FIG. 6 is a front view of the plasma generator portion of the apparatus.

Referring to FIGS. 6 and 7, the plasma generator 62 includes a microwave generator 64 and a gas source 66. The microwave generator 62 induces a wave having a frequency in the microwave range. Preferably the microwave frequencies utilized is 915 or 2450 MHz. The wave is confined by a conduit 68 which is made from aluminium. Conduit 68 is intersected by a gas feed tube 70. Preferably conduit 68 extends at least one wavelength past the intersection of gas feed tube 70. Gas feed tube 70 is made from glass. A swirl jet 72 is inserted in gas feed tube as close as practicable to conduit 68 but before it intersects conduit 68.

Swirl jet 72 is an inert insert which has a plurality of radial cuts formed therein to form a plurality of thin pie shaped pieces 74. As the gas passes through swirl jet 72 the gas swirls as shown by arrows 76. Prior art plasma generates have been much more expensive to operate because they have been operated at a negative pressure. By utilizing swirl jet 72 the need for operating the plasma generator at a negative pressure is eliminated and accordingly the cost of operating the plasma generator is greatly reduced, Experiments show that when the swirl jet 72 is inserted in the conduit 68 the incidences of burst glass feed tubes 70 is reduced. The applicants theorize that the effect of the swirl jet is to agitate the input gases. This then reduces the likelihood of the elements in the plasma being attracted to the silicon in the glass tube and causing the glass tube to break. Where the elements in the plasma are attracted and bond with material in the glass feed tube 70 the temperature of the glass feed tube will increase considerably and tube 70 will burst. Accordingly the length of glass feed tube 70 must be relatively short so that the elements in the plasma will still be agitated when the plasma enters the plasma zone or reactor 56.

Typically the start up input gas is helium and a storage tank for helium is shown at 77 see FIG. 3. Once the system has completed start up any gases that have not been converted into liquid will be recycled and form part of the input gases into the plasma generator 62. As previously discussed, typically helium will be approximately 20% by volume of the input gases.

Spray zone 58 includes a plurality of nozzles 78 postioned generally at a right angle elbow 60 of conduit 82. Nozzles 78 are positioned such that the NaOH solution is sprayed generally in opposite directions. Some nozzles are positioned so that the solution is sprayed in the direction of flow of the gas stream and others are positioned to spray the solution in the opposite direction to the flow of the gas stream. The intention is to create a curtain or static area of the solution through which the gas stream must pass. A pump 81 pumps sodium hydroxide and water 83 to the nozzles 78.

The solution used in the spray zone is a sodium hydroxide solution in the range of 1.2 to 2.0 molar. Preferably it is a 1.5 molar solution. The sodium hydroxide solution provides the hydroxide ion to the system. In addition, the sodium hydroxide solution provides a sodium ion which can be utilized to combine with the chloride ion, if present, and form a salt. One of the common components of plastics is chloride ions. To neutralize chloride ions a sufficiently positive ion is required to attract the negative chloride ion. The sodium is highly electro-positive and produces a non-toxic salt, (Na+ OH)+(Cl−)=(NaCl+$H_2O$). The hydroxide ion combines very well with the carbon monoxide molecule to form a liquid hydrocarbon. Carbon monoxide is a strong reducing agent.

Condensing zone 60 is the portion of the apparatus wherein the gas stream is cooled and the liquids are removed. A second right angle elbow 84, see FIG. 3, causes the gas stream to slow down. When the gas stream slows down any particulate matter that may be suspended therein will fall out. A seal pot 86 is positioned below the second elbow 84 to catch particulate matter. Seal pot 86 may also collect some liquid such as water, sodium hydroxide and dissolved or suspended volatile and semi-volatile organic hydrocarbon liquids.

Mist eliminators (not shown) are positioned in condensing zone 60. Filters of a "BRILLO PAD"™ type material, which is made from 316 stainless steel mesh, are positioned in the conduit such that the gas stream must pass therethrough. The effect of the filters is to create a pressure drop in the system such that the flow of the gas stream will be slowed. Further the filters provide a surface area for the liquid hydrocarbons to condense. The stainless steel mesh filters may be impregnated with iridium to enhance their effective life span. Generally diesel fuel ($C_9$ and greater) will condense at 100° C. plus; benzene, toluene and styrene will condense between 80 and 100° C.; and alcohols and acids will condense between 50 and 70° C. A series of pots 90 are positioned proximate to the mist eliminators to collect the liquids that have been condensed.

Alternatively or in addition in the condensing zone 60, water may be sprayed at 93 onto the gas stream to cool the gas stream.

Any gases which have not been converted into liquids will be passed through the gas compressor 92 via conduit 94 and then to plasma generator 64. These gases the form part of the input gases. Thus the system does not allow for any emission into the atmosphere. It will be appreciated by those skilled in the art that the helium used for the plasma generator will not be converted to liquid hydrocarbons thus helium will always be cycled through the system.

The process is conducted at a negative pressure which causes the gas stream to be drawn through the system. The negative pressure is achieved by the gas compressor 92. In particular the pressure in furnace 54 should not be allowed to build up because this may cause the radicals to recombine. Therefore, preferably the pressure in the furnace is kept below atmospheric pressure.

Formulas

The applicants have theorized that a number of chemical reactions are taking place during the process of the present invention. To fully understand the process the following equations are presented as suggestions of the chemical reactions that take place during the process.

Carbon monoxide $$\text{Char } CO + NaOH + H_2O \longrightarrow HCOOH + NaOH$$

$$C_{(char)} + H_2O_{(steam)} \longrightarrow CO + H_2$$

$$CO + 2H_2 \longrightarrow CH_3OH$$

Styrene and butadiene $$S + 2H_2O \longrightarrow H_2SO_4 + H_2$$

$$H_2SO_4 + NaOH \longrightarrow NaHSO_4$$

At low energy levels, the following reactions occur $$H_2 + (C_4H_5)_2 \longrightarrow C_4H_8$$

$$C_4H_8 + NaOH + H_2O \longrightarrow C_4H_7OH + H_2O + NaOH$$

$$C_8H_8 + 2H_2 \longrightarrow C_7H_8 + CH_4{***}$$

$$2H_2 + C_8H_8 \longrightarrow C_8H_8 + C_2H_8$$

$$C_8H_8 + NaOH + H_2O \longrightarrow C_8H_9OH + NaOH$$

$$C_6H_5 + 1/2\,H_2 \longrightarrow C_8H_6$$

$$C_6H_5 + NaOH + H_2O \longrightarrow C_6H_5OH + 1/2\,H_2 + NaOH$$

Polyethylene or Polyvinylchloride $$H_2 + (C_2H_4)_n \longrightarrow C_2H_5{***}$$

$$(C_2H_4)_n + NaOH + H_2O \longrightarrow C_2H_5OH + NaOH$$

$$(C_2H_3Cl)_n + H_2 \longrightarrow C_2H_4 + HCl$$

$$HCl + C_2H_4 + NaOH + H_2O \longrightarrow NaCl + H_2O + C_2H_5OH$$

***The gaseous compounds i.e. methane and ethane formed above will be oxidized via catalytic conversion with water, to the following:

$$CH_4 + H_2O \xrightarrow{\text{pd or Ir}} CH_3OH + H_2$$

or . . .

$$CH_4 + 3H_2O_2 \xrightarrow{\text{He (plasma reaction)}} CO + 5H_2O$$

EXPERIMENTAL RESULTS

Some experimental results are shown here:

| DATE OF EXPERIMENT | APRIL 8, 1996 | MAY 9, 1996 | MAY 10, 1996 |
|---|---|---|---|
| TYPE OF INPUT | RUBBER TIRES | RUBBER TIRES | RUBBER TIRES |
| SIZE OF INPUT | 2" CHUNKS | 2" CHUNKS | 2" CHUNKS |
| RATE OF ENTRY | 1 INCH/MINUTE | ½ INCH/MINUTE | ½ INCH/MINUTE |
| TEMPERATURES (° C.) | | | |
| FEED | 426 | 521 | 523 |
| CORE | 762 | 831 | 813 |
| REACTOR | 411 | 407 | 410 |
| ZONE 1 OF FURNACE | 800 | 900 | 900 |
| ZONE 2 OF FURNACE | 800 | 900 | 900 |
| ZONE 3 OF FURNACE | 1000 | 1000 | 1000 |
| PRESSURES (AVE. PSI) | | | |
| FEED TUBE | 14.716 | 14.716 | 14.716 |
| BELOW SPRAYS | 14.758 | 14.753 | 14.753 |
| PLASMA INPUT/WATTS | 2000 | 2000 | 2000 |
| HELIUM (cu. ft. in all) | 10 | 10 | 10 |
| NaOH | | | |
| pH/molarity | 14/1.2 | 14/1.5 | 14/1.5 |
| RATE | 1 liter/min | 1 liter/min | 1 liter/min |
| VOLUME consumed | 75 liters | 90 liters | 90 liters |
| OUTPUT/AVERAGE % | | | |
| LIQUIDS from initial spraying | | | |
| C1–C5 | 8.1 | 25.0 | 25.6 |
| C6–C10 | 90.9 | 75.0 | 74.4 |

-continued

| DATE OF EXPERIMENT | APRIL 8, 1996 | MAY 9, 1996 | MAY 10, 1996 |
|---|---|---|---|
| GASES IN REACTOR (%)**PLASMA | | | |
| C2–CX | 76.8 | 99.4 | 99.1 |
| HYDROGEN | 20.1 | 0 | 0 |
| NITROGEN | 0 | 0 | 3.1 |
| FINAL GAS CONTENT (%)*** | | | |
| CARBON MONOXIDE | 66.3 | 11.4 | 7.9 |
| HYDROGEN | 33.1 | 54.5 | 91.7 |
| C2–CX | 0 | 33.8 | 0 |

***The gases reported in the reactor are percentage by volume of sample.
Similarly the final gas content are percentage by volume.

It will be appreciated that the above description related to one embodiment by way of example only. Many variations on the invention will be obvious to those skilled in the art and such obvious variations are within the scope of the invention as described herein whether or not expressly described.

What is claimed as the invention is:

1. A process for producing liquid hydrocarbons from hydrocarbon materials having at least one carbon atom and a hydrogen group comprising the steps of:

heating the hydrocarbon materials to a temperature above 400° C. thereby producing a gas stream;

producing a gaseous plasma;

mixing the gas stream with the gaseous plasma thereby providing an ionized gas stream;

saturating the ionized gas stream with hydroxide ions to produce a saturated gas stream;

cooling the saturated gas stream to standard temperature and pressure and condensing the saturated gas stream to produce liquid hydrocarbons and waste gases.

2. A process for producing liquid hydrocarbons as claimed in claim 1 wherein the waste gases are used to form the gaseous plasma.

3. A process for producing liquid hydrocarbons as claimed in claim 1 wherein the hydroxide ion is provided in a sodium hydroxide spray.

4. A process for producing liquid hydrocarbons as claimed in claim 3 wherein the sodium hydroxide is provided in a predetermined range between 1.2 and 2.0 molar.

5. A process for producing liquid hydrocarbons as claimed in claim 4 wherein sodium hydroxide is provided at 1.5 molar.

6. A process for producing liquid hydrocarbons as claimed in claim 1 wherein the hydrocarbon material is tires.

7. A process for producing liquid hydrocarbons as claimed in claim 6 wherein the tires are shredded to a size of generally greater than 6 inches in diameter.

8. A process for producing liquid hydrocarbons as claimed in claim 1 wherein the process is conducted at a negative pressure thereby providing a means of drawing the gas stream through the process and minimizing the repolymerization during the production of the gas stream.

9. A process for producing liquid hydrocarbons as claimed in claim 1 wherein the gas is produced in a furnace and the pressure in the furnace is kept below atmospheric pressure.

10. A process for producing liquid hydrocarbons as claimed in claim 9 wherein the furnace is a resistance heating furnace.

11. A process for producing liquid hydrocarbons as claimed in claim 2 wherein a catalyst is used to ignite the gaseous plasma, the catalyst being helium and thereafter the waste gases are used to sustain the plasma.

12. A process for producing liquid hydrocarbons as claimed in claim 1 wherein hydrogen is part of the waste gases and hydrogen is removed by molecular filters.

13. A process for producing hydrocarbons as claimed in claim 12 wherein hydrogen is used as a fuel source to heat the hydrocarbon materials.

14. A process for producing hydrocarbons as claimed in claim 1 wherein the process is conducted at a pressure below atmospheric.

15. A process for producing hydrocarbons as claims in claim 2 wherein the process is a closed process whereby no gases are released into the atmosphere.

* * * * *